United States Patent
Sugi et al.

(10) Patent No.: US 8,367,948 B2
(45) Date of Patent: Feb. 5, 2013

(54) HANDHELD DEVICE

(75) Inventors: Atsushi Sugi, Tokyo (JP); Shigeru Yamaguchi, Kawasaki (JP); Yoshiya Matsumoto, Kawasaki (JP); Satoshi Seino, Kawasaki (JP); Tsukasa Goro, Kawasaki (JP); Wataru Murata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 455 days.

(21) Appl. No.: 12/453,002

(22) Filed: Apr. 27, 2009

(65) Prior Publication Data

US 2009/0266697 A1    Oct. 29, 2009

(30) Foreign Application Priority Data

Apr. 28, 2008    (JP) ................... 2008-117853

(51) Int. Cl.
    *H01H 13/00*    (2006.01)
(52) U.S. Cl. .......... 200/5 R; 200/5 A; 200/341; 200/343
(58) Field of Classification Search ............... 200/5 R, 200/5 A, 520, 18, 341–345, 296; 341/22; 345/168, 169; 455/575.1, 575.3
See application file for complete search history.

(56) References Cited

U.S. PATENT DOCUMENTS

| | | | | |
|---|---|---|---|---|
| 6,148,183 A * | 11/2000 | Higdon et al. | ............. | 455/575.1 |
| 6,196,738 B1 * | 3/2001 | Shimizu et al. | ............. | 400/490 |
| 6,623,660 B1 * | 9/2003 | Kimura | ............. | 252/299.01 |
| 6,713,698 B2 * | 3/2004 | Kashino | ............. | 200/341 |
| 7,046,136 B2 * | 5/2006 | Sugimoto et al. | ............. | 340/539.1 |
| 7,138,588 B2 * | 11/2006 | Soumi | ............. | 200/5 A |
| 7,273,993 B1 * | 9/2007 | Tanner et al. | ............. | 200/314 |
| 7,488,910 B2 * | 2/2009 | Hong | ............. | 200/310 |
| 7,633,030 B2 * | 12/2009 | Chang | ............. | 200/341 |
| 7,656,675 B2 * | 2/2010 | Kim et al. | ............. | 361/752 |
| 7,759,594 B2 * | 7/2010 | Ishii et al. | ............. | 200/512 |

FOREIGN PATENT DOCUMENTS

| | | |
|---|---|---|
| CN | 1476214 A | 2/2004 |
| CN | 1917111 A | 2/2007 |
| JP | 2002-015639 | 1/2002 |
| JP | 2005-252343 | 9/2005 |
| JP | 2006-338972 | 12/2006 |
| JP | 2007-243866 | 9/2007 |

OTHER PUBLICATIONS

Chinese Office Action issued Nov. 2, 2011 in corresponding Chinese Patent Application No. 200910133585.3.
Japanese Office Action for related Japanese Patent Application No. 2008-117853, mailed on Jul. 3, 2012.

\* cited by examiner

*Primary Examiner* — Michael Friedhofer
(74) *Attorney, Agent, or Firm* — Staas & Halsey LLP

(57) ABSTRACT

A pair of side keys disposed on a lateral plate casing of a stationary-side rear case in a cellular phone is coupled with a film sheet that is fabricated in a substantially identical length to the length of the pair of side keys. The pair of side keys is coupled with the film sheet by applying double-faced adhesive tapes having adhesive faces on both sides only to both ends of the film sheet.

7 Claims, 6 Drawing Sheets

HANDHELD DEVICE

CROSS-REFERENCE TO RELATED APPLICATIONS

This application is based upon and claims the benefit of priority of the prior Japanese Patent Application No. 2008-117853, filed on Apr. 28, 2008, the entire contents of which are incorporated herein by reference.

BACKGROUND

1. Field

The present invention relates to a handheld device in which a plurality of side keys are provided for performing predetermined operations such as volume adjustment and particularly relates to a handheld device in which side keys are integratedly coupled with a film sheet such that the handheld device can be assembled without difficulty and in a downsized form.

2. Description of the Related Art

In a typical cellular phone, a movable-side housing with a display panel and a stationary-side housing with an operation panel are coupled in a foldable manner. In recent years, with the popularization of cellular phones having one-segment broadcast functionality, volume adjustment keys (side keys) used to adjust the volume of radio broadcast or television broadcast are attached to a lateral side of the stationary-side housing of a cellular phone (e.g., see Japanese Patent Application Laid-open No. 2005-252343). Such side keys on a lateral side of the stationary-side housing of a cellular phone are maintained coupled to the lateral side of the stationary-side housing with the use of, e.g., a rubber plate.

Given below is the description with reference to FIGS. 7A and 7B of a side-key attachment configuration in a conventional cellular phone. FIG. 7A is side view for explaining a pre-coupled condition of side keys and a rubber sheet. FIG. 7B is side view for explaining a coupled condition of side keys and a rubber sheet.

As shown in FIG. 7A, each of two side keys 40a includes a side key body 41, a bottom plate 43 located beneath the corresponding side key body 41 and an outwardly (toward downside in FIGS. 7A and 7B) protruding pin 44. A rubber sheet 70 is a long sheet-plate that has a circular hole 71 on each end of its body for inserting therethrough the pins 44 of the side keys 40a.

As shown in FIG. 7B, the side keys 40a are fixedly attached to the rubber sheet 70 by applying an adhesive over a predetermined portion of the rubber sheet 70. In this way, the side keys 40a can be fabricated into an integrated key switch.

By operating the fixedly coupled side keys 40a, it is possible to switch ON or switch OFF an operation switch disposed on a circuit board (not shown) inside a stationary-side rear case 120. More particularly, e.g., it is possible to adjust the volume of broadcast by operating the pin 44.

In the case of the above-mentioned conventional side-key attachment configuration in a cellular phone, the independent side keys 40a are coupled with the rubber sheet 70. However, it consumes time to fabricate the rubber sheet 70 of predetermined dimensions. Moreover, it is also necessary to manufacture the rubber sheet 70 as a relatively thick sheet (thickness t of about 0.3 mm). Thus, a portion $L_1$ at both ends of the fabricated rubber sheet 70 is surplus as compared to external dimension L of the side keys 40a. That condition stands in the way of manufacturing small and slim cellular phones.

SUMMARY

It is an object of the present invention to at least partially solve the problems in the conventional technology.

According to an aspect of an embodiment, a handheld device includes a movable-side housing that includes a display panel and a liquid crystal display unit; and a stationary-side housing that includes an operation panel with a numerical keypad and a pair of side keys used for predetermined operations. The pair of side keys is integratedly coupled with a film sheet fabricated in a substantially identical length to the length of the pair of side keys.

According to another aspect of an embodiment, a handheld device includes a movable-side housing that includes a display panel and a liquid crystal display unit; and a stationary-side housing that includes an operation panel with a numerical keypad and a pair of side keys each having a pin used to switch ON an operation switch disposed on a circuit board and used for predetermined operations. The pair of side keys is integratedly coupled with a film sheet fabricated in a substantially identical length to the length of the pair of side keys.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

An exemplary embodiment of the present invention is described in detail below with reference to the accompanying drawings. In the exemplary embodiment, description is given for a cellular phone as a handheld device. The present invention is not limited to the exemplary embodiment.

Figure 1:
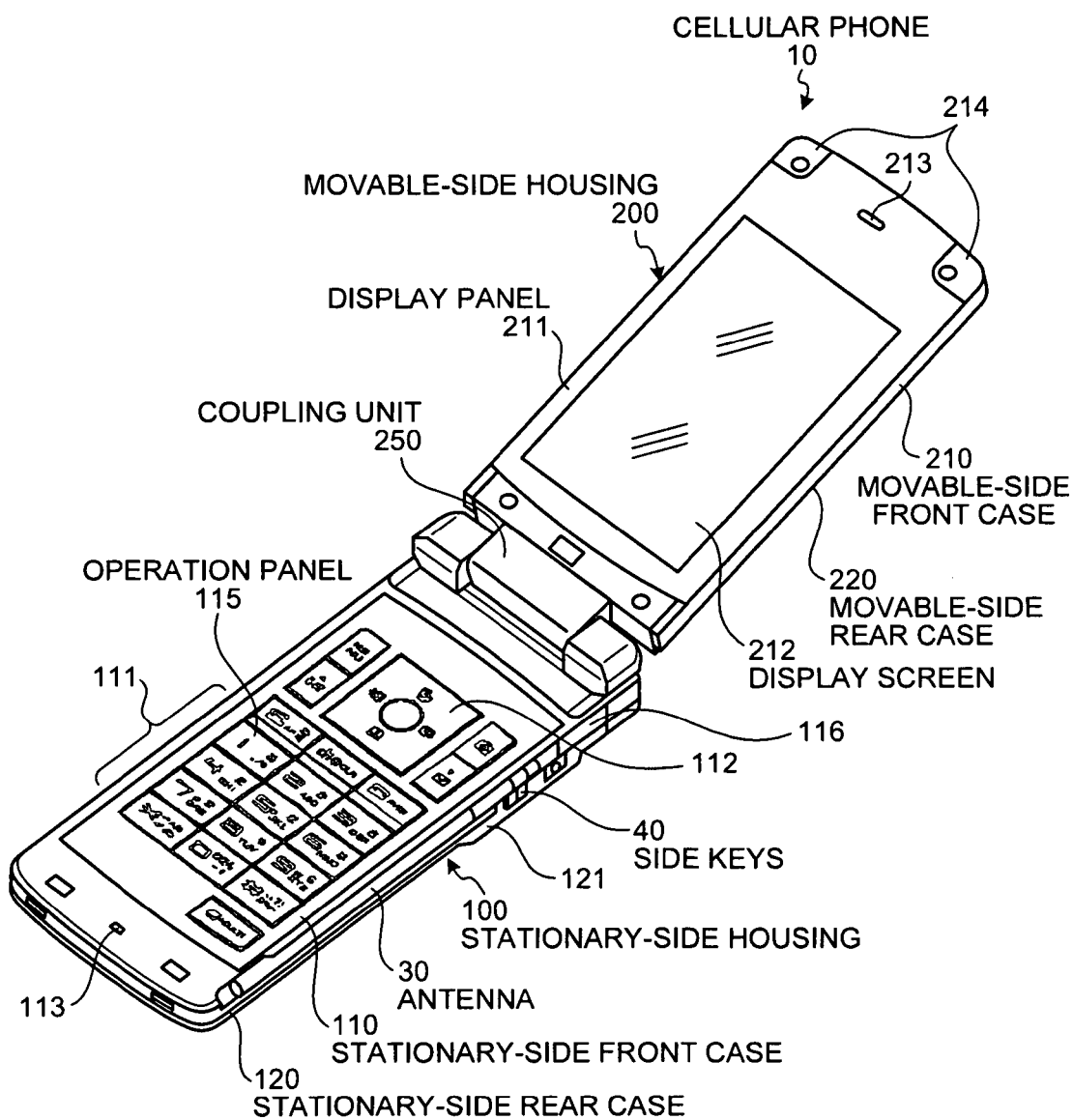
FIG. 1 is an external perspective view of a cellular phone in an open state according to a first embodiment.

Given below is the description of an exemplary configuration of a cellular phone 10 with reference to FIG. 1. FIG. 1 is an external perspective view of the cellular phone 10 in an open state according to a first embodiment of the present invention. As shown in FIG. 1, the cellular phone 10 includes a palm-size stationary-side housing 100 and a movable-side housing 200. The stationary-side housing 100 and the movable-side housing 200 are coupled by a coupling unit 250.

More particularly, in the cellular phone 10 shown in FIG. 1, the stationary-side housing 100 is used to talk during a telephone call and has a plurality of operating keys such as a numerical keypad 111 with number keys (from 0 to 9) and a function key 112 (mode setting key). The movable-side housing 200 is fabricated to have a substantially identical size to that of the stationary-side housing 100 and includes an LCD module (not shown). The coupling unit 250 couples the movable-side housing 200 to the stationary-side housing 100 in a foldable manner. The stationary-side housing 100 and the movable-side housing 200 are fabricated in a box shape from, although not limited to, a lightweight and high-strength magnesium alloy.

The stationary-side housing 100 is a two-fraction structure of a stationary-side front case 110 on the front side and a stationary-side rear case 120 on the rear side (the downside in FIG. 1). The stationary-side front case 110 includes an operation panel 115 in which the operation keys such as the numerical keypad 111 and the like are arranged.

More particularly, as shown in FIG. 1, the stationary-side front case 110 includes the numerical keypad 111, the function key 112, and a mouthpiece 113 having a microphone to convert voice of the user into electric signals. The stationary-side front case 110 and the stationary-side rear case 120 are clamped together at four positions by using spanning screws (not shown).

An external foldable antenna 30 is fixedly attached to a lateral plate casing 116 of the stationary-side front case 110. A pair of volume adjustment keys (side keys) 40, which is used to adjust the volume of radio broadcast or the like, is disposed on a lateral plate casing 121 of the stationary-side rear case 120.

The movable-side housing 200 is a two-fraction structure of a movable-side front case 210 on the front side and a movable-side rear case 220 on the rear side (downside in FIG. 1). As shown in FIG. 1, a large-size display panel 211 and a large-size display screen 212 are arranged in the substantially central portion of the movable-side front case 210. The display panel 211 and the display screen 212 are used for viewing the display output by an LCD module (not shown).

An earpiece 213 is disposed in the top portion of the movable-side front case 210. The earpiece 213 catches the voice of the person on the other end of the line during a conversation. The movable-side front case 210 and the movable-side rear case 220 are clamped at four positions by using spanning screws (not shown). The spanning screws in the top portion of the display panel 211 are covered by screw covers 214.

Figure 2:
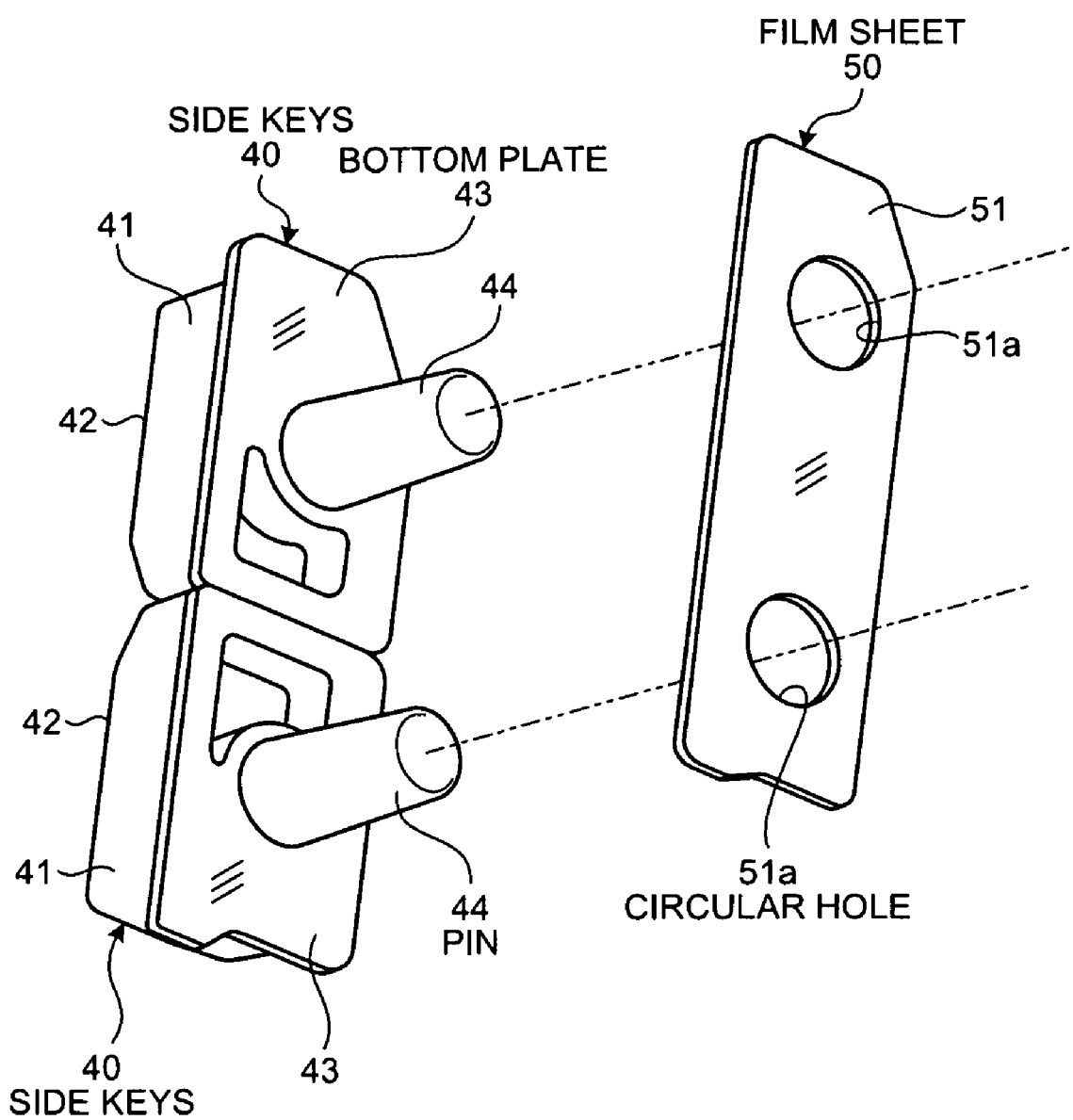
FIG. 2 is a perspective view for explaining a pre-coupled condition of side keys and a film sheet.
Figure 3:
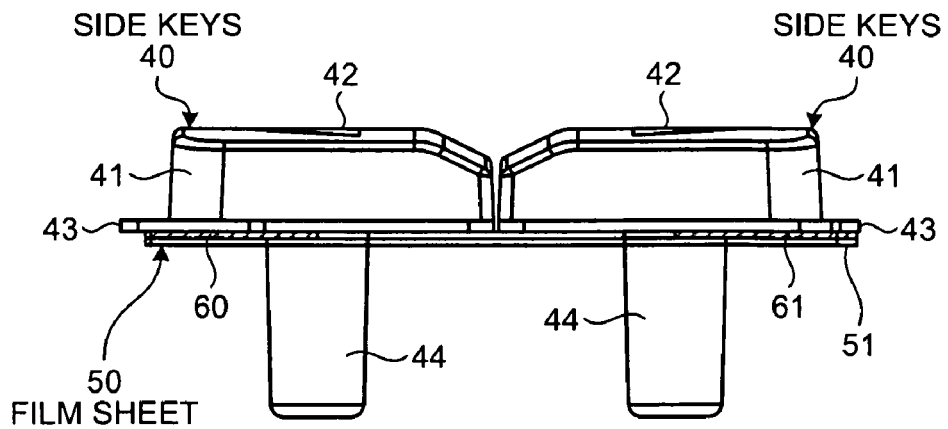
FIG. 3 is a side view for explaining a coupled condition of the side keys and the film sheet.
Figure 4:
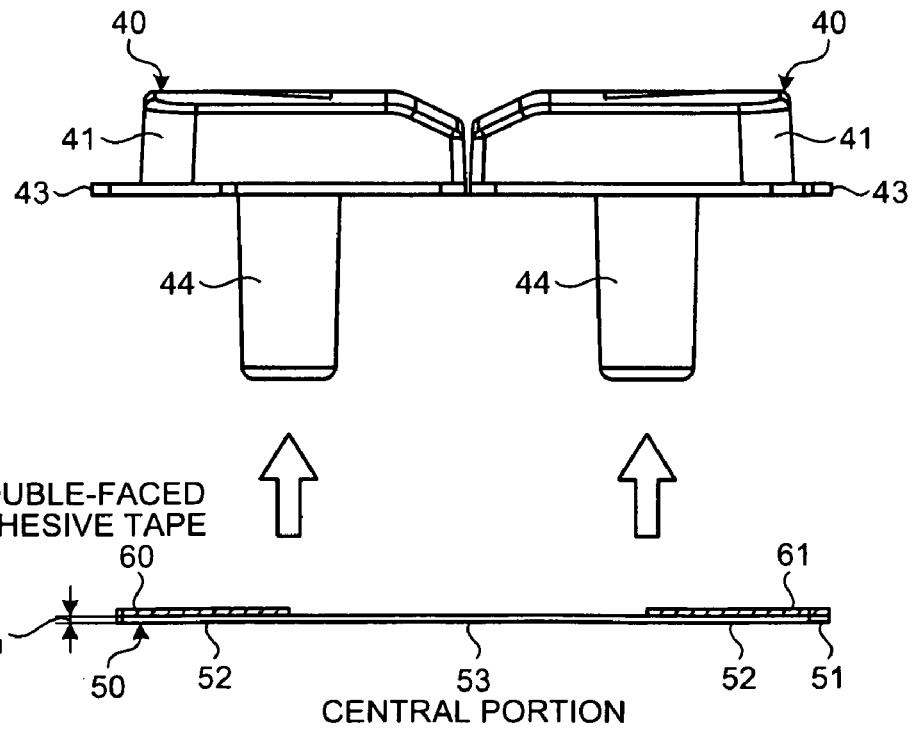
FIG. 4 is a side view for explaining a pre-coupled condition of the side keys and the film sheet.
Figure 5A:
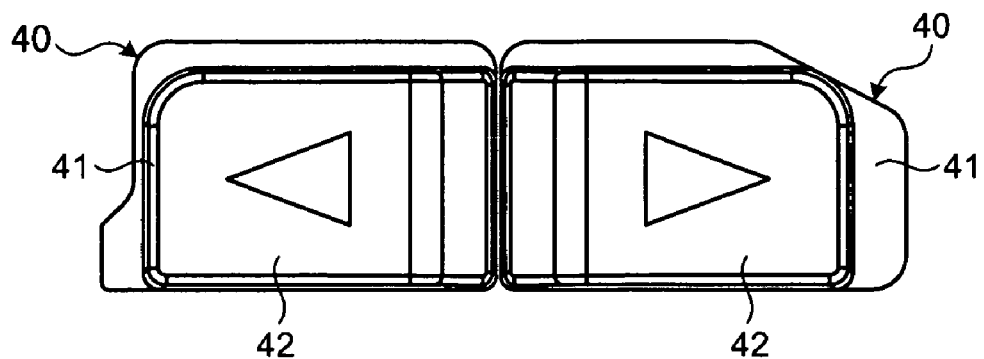
FIG. 5A is a top view of the side keys.
Figure 5B:
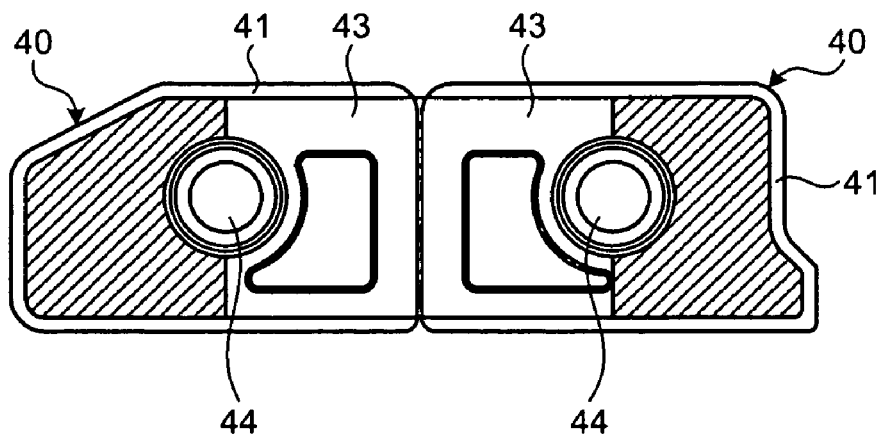
FIG. 5B is a bottom plan view of the side keys.

Given below is the description of side keys and a film sheet with reference to FIGS. 2 to 5. FIG. 2 is a perspective view for explaining a pre-coupled condition of side keys and a film sheet. FIG. 3 is a side view for explaining a coupled condition of the side keys and the film sheet. FIG. 4 is a side view for explaining a pre-coupled condition of the side keys and the film sheet. FIG. 5A is a top view of the side keys and FIG. 5B is a bottom plan view of the side keys.

As described above, the cellular phone 10 according to the first embodiment has a characteristic structure of the pair of side keys 40 disposed on the lateral plate casing 121 of the stationary-side rear case 120 and a film sheet 50. Thus, given below is the description of the structure of the pair of side keys 40 and the film sheet 50.

As an outline, in the cellular phone 10 according to the first embodiment, the pair of side keys 40 disposed on the lateral plate casing 121 of the stationary-side rear case 120 is fixedly coupled with the film sheet 50, which is fabricated in a substantially identical length to the length of the pair of side keys 40. The pair of side keys 40 is coupled with the film sheet 50 by applying two double-faced adhesive tapes 60 and 61 that have adhesive faces on both sides.

That is, as shown in FIGS. 2 to 5B, each of the side keys 40 includes a side key body (a substantially rectangular body) 41 and a bottom plate 43 located beneath the corresponding side key body 41. The pair of side keys 40 is coupled with the film sheet 50 to form an integrated key switch. An arrow icon is inscribed on a top surface 42 of each side key 40 (see FIG. 5A). The arrow icons indicate directions of volume adjustment.

In each side key 40, an outwardly (toward right side in FIG. 2, toward downside in FIGS. 3 and 4) protruding pin 44 is disposed in the substantially central portion of the bottom plate 43, which is located beneath the side key body 41.

The pin 44 is used to switch ON or switch OFF an operation switch (level adjustment) disposed on a circuit board (not shown) inside the stationary-side rear case 120. More particularly, the volume gets adjusted depending on the switched ON condition of the pin 44.

As shown in FIG. 4, the film sheet 50 includes a long, thin (thickness $t_1$ of about 0.1 mm), and transparent film sheet body 51 that has a substantially identical length and shape to that of the pair of side keys 40.

The film sheet 50 is made of a long and transparent PET film sheet. The acronym PET stands for polyethylene terephthalate, which is an easily processable resin. A PET film sheet has sufficient stretching properties to be used as a protecting film on the surface of a polarizing plate of a liquid crystal display or a plasma display.

Moreover, because the film sheet 50 is as flexile as a conventional rubber sheet, it becomes possible to fabricate the film sheet 50 in a variety of thickness or size. As a result, the film sheet 50 can be disposed within the external dimension of the pair of side keys 40.

Figure 7A:
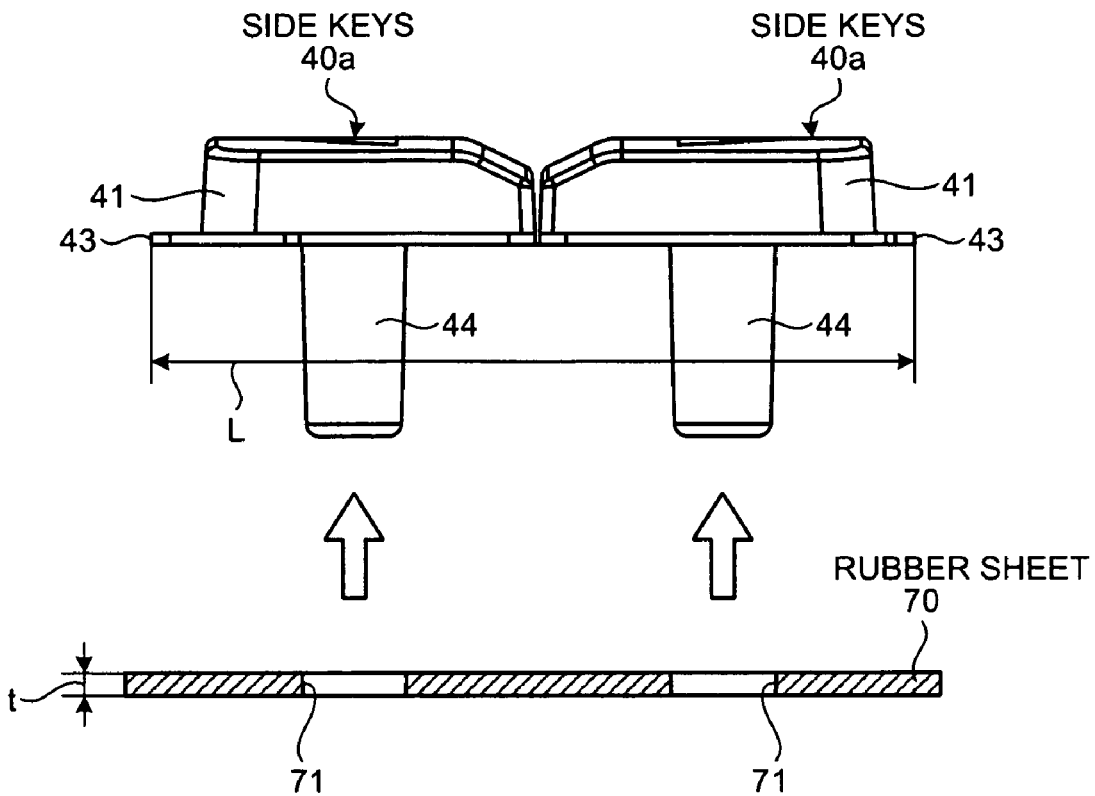
FIG. 7A is a side view for explaining a conventional pre-coupled condition of side keys and a rubber sheet.
Figure 7B:
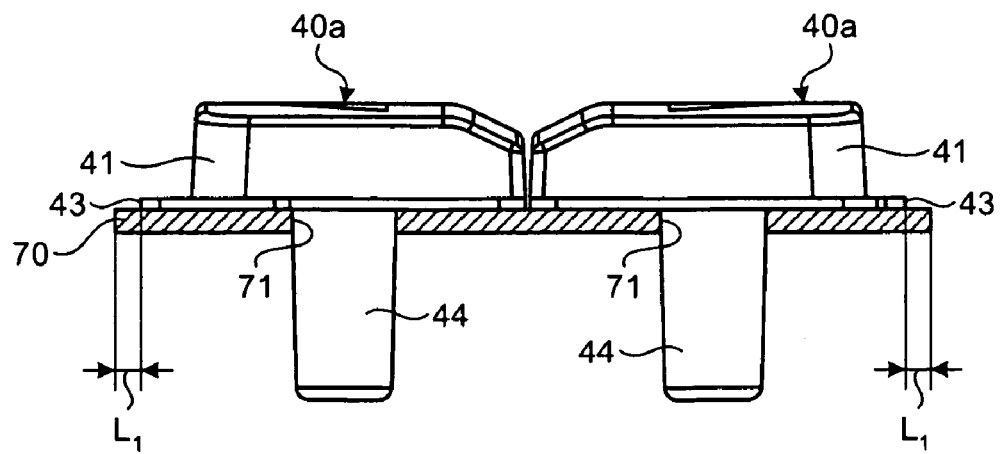
FIG. 7B is a side view for explaining a conventional coupled condition of side keys and a rubber sheet.

Thus, a coupling unit can be configured that is smaller than the external dimension of the conventional pair of side keys 40a shown in FIGS. 7A and 7B. That facilitates in disposing the pair of side keys 40a in a smaller design with less distance therebetween. As a result, it becomes possible to manufacture a small and slim cellular phone 10.

The film sheet body 51 of the film sheet 50 has a circular hole 51a (see FIG. 2) on each end for inserting therethrough the pins 44 disposed on the bottom plates 43 of the two side keys 40.

The film sheet 50 is coupled with the pair of side keys 40 by applying the double-faced adhesive tapes 60 and 61, which have adhesive faces on both sides, to both end portions on one side (topside in FIGS. 3 and 4) of the film sheet body 51 of the film sheet 50.

In other words, one adhesive face (facing downside in FIGS. 3 and 4) of each of the double-faced adhesive tapes 60 and 61 is applied to two ends 52 of the film sheet body 51 of the film sheet 50.

The double-faced adhesive tapes 60 and 61 are applied over end portions 63 (or portions 52 in FIG. 4) of the film sheet 50 (FIG. 4). More particularly, after inserting the pins 44 of each of the pair of side keys 40 through the circular holes 51a (FIG. 2) of the film sheet 50, the film sheet 50 is fixedly coupled with the pair of side keys by the double-faced adhesive tapes 60 and 61.

Thus, a central portion 53 (see FIG. 4) over which the double-faced adhesive tapes 60 and 61 are not applied is not an adhesive area for the double-faced adhesive tapes 60 and 61. Consequently, as shown in FIGS. 6A and 6B, after the film sheet 50 is coupled with the pair of side keys 40, the pair of side keys 40 can separately move up and down within the central portion 53.

Figure 6A:
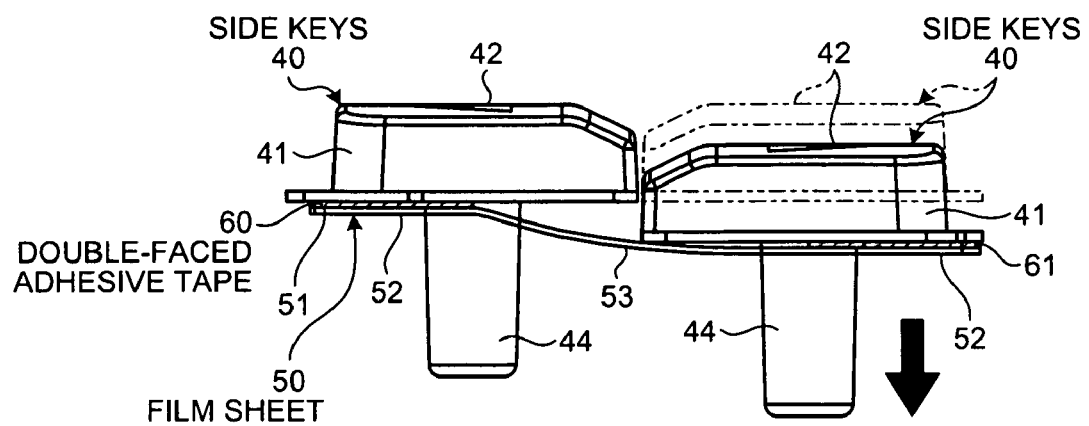
FIG. 6A is a side view for explaining movement of the side keys.
Figure 6B:
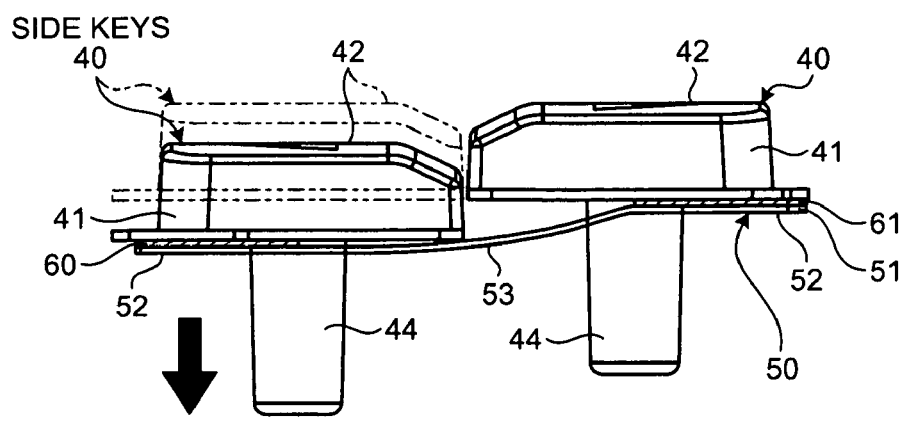
FIG. 6B is a side view for explaining movement of the side keys.

FIGS. 6A and 6B are side views for explaining movement of the side keys 40. As shown in FIGS. 6A and 6B, the adhesive area for the double-faced adhesive tapes 60 and 61 lies at the end portions 52 on the outer sides of the side keys 40. Thus, the side keys 40 can independently move in a predetermined direction (up and down in FIGS. 6A and 6B) within the central portion 53, which is not an adhesive area.

More particularly, as shown in FIG. 6A, when one of the side keys 40 (the side key 40 on the right side in FIG. 6A) is pressed, the film sheet 50 undergoes deformation around the central portion 53 such that the pressed side key 40 can independently and easily move to a predetermined position.

Similarly, when the other side key 40 (the side key on the left side in FIG. 6B) is pressed, the film sheet 50 undergoes deformation around the central portion such that the pressed side key 40 can independently and easily move to a predetermined position.

Although the film sheet 50 is made of a PET film sheet as described above in the first embodiment, it is also possible to use any other film sheet that has stretching properties and that is easily processable.

Thus, as described above, in the cellular phone 10 according to the first embodiment, the pair of side keys 40 disposed on the lateral plate casing 121 is fixedly coupled with the film sheet 50, which is fabricated in a substantially identical length to the length of the pair of side keys 40. The pair of side keys 40 is coupled with the film sheet 50 by applying the double-faced adhesive tapes 60 and 61, which have adhesive faces on both sides, at both ends of the pair of side keys 40. That enhances the efficiency in attaching the pair of side keys 40. Moreover, the pair of side keys 40 can be attached within a smaller portion of the cellular phone 10 thereby enabling to manufacture a slim and small cellular phone 10.

Although the invention has been described with respect to the first embodiment for a complete and clear disclosure, the appended claims are not to be thus limited but are to be construed as embodying all modifications and alternative constructions that may occur to one skilled in the art that fairly fall within the basic teaching herein set forth.

Meanwhile, although the first embodiment is given for a folding cellular phone with a hinge structure, it is also possible to use a hinge structure other than that shown in the drawings. Moreover, instead of a folding cellular phone, the above description can also be implemented for a cellular phone in which a movable-side housing is overlappably coupled to a stationary-side housing with the use of a coupling unit having a sliding structure or a rotating structure.

The handheld device in the first embodiment is assumed to be a cellular phone. However, the above description can also be implemented as a side-key attachment configuration for a small-size information processing device such as a personal digital assistant (PDA), or a small-size music player, or a portable television, or a handheld gaming device.

Moreover, according to the first embodiment, the side-key attachment configuration is described with reference to a volume adjustment key. However, the side-key attachment configuration can also be implemented for attachment of a channel key that is used to change channels of radio broadcast or television broadcast in a cellular phone having one-segment broadcast functionality.

In this way, according to the embodiments, a pair of side keys disposed on a handheld device includes two side keys each having a pin that is operated to switch ON or switch OFF an operation switch disposed on a circuit board inside a stationary-side rear case. The pair of side keys is fixedly coupled with a film sheet that is fabricated in a substantially identical length to the length of the pair of side keys. The pair of side keys is coupled with the film sheet by applying double-faced adhesive tapes to the underside of the pair of side keys. That enhances the efficiency in attaching the pair of side keys to the handheld device. Moreover, the pair of side keys can be attached within a smaller portion of the handheld device thereby enabling to manufacture a slim and small handheld device.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A handheld device comprising:
   a housing that includes a pair of side keys used for predetermined operations;
   a film sheet that is integratedly coupled with the pair of side keys, the film sheet being fabricated in a substantially identical length to a length of the pair of side keys; and
   a double-faced adhesive tape having adhesive faces on both sides, the double-faced adhesive tape coupling the film sheet and the pair of side keys by bonding the ends of the film sheet to both ends of the pair of side keys.

2. The handheld device according to claim 1, wherein the film sheet is made of polyethylene terephthalate resin.

3. A handheld device comprising:
   a housing that includes a pair of side keys each having a pin used to switch ON an operation switch disposed on a circuit board and used for predetermined operations;
   a film sheet that is integratedly coupled with the pair of side keys, the film sheet being fabricated in a substantially identical length to a length of the pair of side keys; and
   a double-faced adhesive tape having adhesive faces on both sides, the double-faced adhesive tape coupling the film sheet and the pair of side keys by bonding the ends of the film sheet to both ends of the pair of side keys.

4. The handheld device according to claim 3, wherein the double-faced adhesive tape couples the film sheet and the pair of side keys leaving a central portion of the film sheet and the pair of side keys uncoupled with each other.

5. The handheld device according to claim 3, wherein holes are created at predetermined positions on the film sheet through which the pin in each side key of the pair of side keys is inserted.

6. The handheld device according to claim 3, wherein the film sheet is made of polyethylene terephthalate resin.

7. The handheld device according to claim 1, wherein the double-faced adhesive tape couples the film sheet and the pair of side keys leaving a central portion of the film sheet and the pair of side keys uncoupled with each other.

* * * * *